(12) United States Patent
Taki (10) Patent No.: US 10,352,478 B2
(45) Date of Patent: Jul. 16, 2019

(54) REPLACEMENT NECESSITY DETERMINATION DEVICE FOR SNAP-IN VALVE

(71) Applicant: TOYOTA JIDOSHA KABUSHIKI KAISHA, Toyota-shi, Aichi (JP)

(72) Inventor: Yuji Taki, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 204 days.

(21) Appl. No.: 15/412,814

(22) Filed: Jan. 23, 2017

(65) Prior Publication Data

US 2017/0241566 A1  Aug. 24, 2017

(30) Foreign Application Priority Data

Feb. 24, 2016  (JP) .................................. 2016-033128

(51) Int. Cl.
*G01M 3/28*  (2006.01)
*B60C 19/00*  (2006.01)
(Continued)

(52) U.S. Cl.
CPC ...... *F16K 37/0091* (2013.01); *B60C 23/0408* (2013.01); *B60C 23/0481* (2013.01); *B60C 23/0488* (2013.01); *B60C 23/0494* (2013.01); *B60C 29/02* (2013.01); *F16K 15/20* (2013.01); *G01M 3/2876* (2013.01);
(Continued)

(58) Field of Classification Search
CPC ............... B60C 23/0408; B60C 29/02; B60C 2019/007; B60C 23/0481; B60C 23/0494; B60C 23/0488; B60C 2019/004
See application file for complete search history.

(56) References Cited

U.S. PATENT DOCUMENTS

| 7,661,299 B2 * | 2/2010 | Kusunoki | ........... B60C 23/0408 |
| | | | 340/442 |
| 9,891,045 B2 * | 2/2018 | Vassilieff | ............ B60C 23/0481 |
| 2013/0304416 A1 | 11/2013 | Vassilieff | |

FOREIGN PATENT DOCUMENTS

| JP | 2005-170224 A | 6/2005 |
| JP | 2008-087574 A | 4/2008 |
| JP | 2008-149967 A | 7/2008 |

OTHER PUBLICATIONS

Dec. 27, 2017 Decision to Grant issued in Japanese Application No. 2016-033128.

\* cited by examiner

*Primary Examiner* — Leslie J Evanisko
*Assistant Examiner* — Leo T Hinze
(74) *Attorney, Agent, or Firm* — Oliff PLC (57) ABSTRACT

Provided is a replacement necessity determination device for a snap-in valve having an inner end to which an air pressure detection device including an air pressure sensor and an acceleration sensor is coupled. A control device of the replacement necessity determination device is configured to predict an angle change amount of the snap-in valve and the air pressure detection device with respect to a wheel caused by a centrifugal force based on a rotational speed of the wheel and an acceleration detected by the acceleration sensor, calculate a degradation indication value of an elastic body of the snap-in valve based on a maximum value of the angle change amount during a period set in advance, and determine necessity of replacement of the snap-in valve based on an integrated value of the degradation indication value.

6 Claims, 6 Drawing Sheets

(51) Int. Cl.
*B60C 23/04* (2006.01)
*B60C 29/02* (2006.01)
*F16K 15/20* (2006.01)
*F16K 37/00* (2006.01)

(52) U.S. Cl.
CPC .. *B60C 2019/004* (2013.01); *B60C 2019/007* (2013.01); *B60Y 2400/301* (2013.01); *B60Y 2400/304* (2013.01); *B60Y 2400/3032* (2013.01)

REPLACEMENT NECESSITY DETERMINATION DEVICE FOR SNAP-IN VALVE

CROSS-REFERENCE TO RELATED APPLICATION

The disclosures of Japanese Patent Application No. JP 2016-33128 filed on Feb. 24, 2016 is incorporated herein by reference in its entirety.

BACKGROUND

1. Technical Field

The present disclosure relates to a replacement necessity determination device for a snap-in valve to which an air pressure detection device is integrally coupled.

2. Description of the Related Art

There is known a valve unit, which is used for a wheel assembly of a vehicle, e.g., a motor vehicle, and has a function of detecting an air pressure. The valve unit includes a valve for adjusting a tire air pressure, and an air pressure detection device integrally coupled to one end of the valve. The air pressure detection device includes an air pressure detection sensor and an acceleration sensor for detecting the rotation of the wheel assembly, and the acceleration sensor is configured to detect an acceleration of the wheel assembly in a radial direction thereof. The air pressure detection device of the valve unit is arranged in an air chamber formed by a rim portion and the tire held by the rim portion, and the valve of the valve unit is mounted to the rim portion under a state in which the valve is inserted into a hole formed in the rim portion of a wheel.

When the mounting of the valve to the rim portion is defective, the air at a high pressure inside the tire leaks via a gap between the valve and the rim portion, resulting in a fast decrease in the tire air pressure. Moreover, the center of gravity of the valve unit exists on the air pressure detection device side with respect to a mounting portion of the valve to the rim portion. Thus, when the mounting of the valve to the rim portion is defective, the valve unit is pivoted by a centrifugal force caused by the rotation of the wheel assembly, and the acceleration sensor cannot appropriately detect the acceleration of the wheel assembly in the radial direction thereof. In order to prevent this problem from occurring in the valve unit, for example, in Japanese Patent Application Laid-open No. 2005-170224, there is described an abnormality detection device for detecting the defective mounting of the valve unit to the rim portion.

In the abnormality detection device described in Japanese Patent Application Laid-open No. 2005-170224, a displacement amount of the pivot of the valve unit is predicted based on a ratio of a second acceleration calculated through differentiation of a wheel assembly speed detected by a wheel assembly speed sensor to a first acceleration detected by the acceleration sensor. When the ratio of the second acceleration to the first acceleration increases, and the displacement amount of the pivot of the valve unit exceeds a reference value, the mounting of the valve to the rim portion is determined to be defective. This abnormality detection device is configured to detect the defective state through use of the fact that as the displacement amount of the pivot of the valve unit increases, an angle of an acceleration detection direction of the acceleration sensor with respect to the radial direction of the wheel assembly increases and a detection value of the acceleration sensor thus becomes less than an original value.

The valve used for the wheel assembly of the vehicle, e.g., a motor vehicle, is classified into a clamp-in valve and a snap-in valve. The clamp-in valve is fixed to the rim portion by using a packing to clamp the rim portion and tightening a nut on the air chamber side. In contrast, the snap-in valve includes a valve stem having a tube shape and an elastic body covering the valve stem, and is mounted to the rim portion under a state in which the elastic body is compressed between the valve stem and the rim portion.

The abnormality detection device described in Japanese Patent Application Laid-open No. 2005-170224 is a device for detecting abnormality of mounting, which is a state in which the valve is inclined, and abnormality of a loosened nut in the clamp-in valve. Even when the abnormality occurs to the clamp-in valve, a displacement amount of pivot of the valve unit does not increase so much. Thus, the ratio of the second acceleration to the first acceleration is a relatively small value when the mounting of the valve is determined to be defective.

When the valve of the valve unit is the snap-in valve, and the valve unit pivots as a result of a centrifugal force caused by the rotation of the wheel assembly, the elastic body is deformed, resulting in a secular degradation. Thus, it is conceivable to apply the abnormality detection device described in Japanese Patent Application Laid-open No. 2005-170224 to the detection of the secular degradation of the valve unit including the snap-in valve, thereby determining a life of the snap-in valve caused by the secular degradation of the elastic body.

However, the snap-in valve is mounted to the rim portion by a compression force of the elastic body, and hence the angle of the pivot of the snap-in valve generated by the application of the centrifugal force is more than that in the clamp-in valve, and increases as the acceleration of the wheel assembly increases and the centrifugal force thus increases. Further, as the deformation of the elastic body is repeated by the pivot of the valve, and the secular degradation of the elastic body progresses, the elastic modulus of the elastic body gradually decreases, and the pivot angle of the clamp-in valve gradually decreases for the same centrifugal force.

Thus, the ratio of the second acceleration to the first acceleration increases as the acceleration of the wheel assembly increases and the centrifugal force thus increases, but the amount of the increase gradually decreases as the secular degradation of the elastic body progresses. Thus, the ratio of the second acceleration to the first acceleration cannot be used as an indication of the secular degradation of the elastic body, and hence the abnormality detection device described in Japanese Patent Application Laid-open No. 2005-170224 cannot be used to determine whether or not the replacement of the snap-in valve caused by the secular degradation of the elastic body is necessary.

SUMMARY

It is a primary object of exemplary aspects of the present disclosure to provide a device capable of predicting a secular degradation of an elastic body of a snap-in valve to which an air pressure detection device is integrally coupled based on stress applied to the elastic body, thereby determining necessity of replacement of the snap-in valve.

According to one embodiment of the present disclosure, there is provided a replacement necessity determination device for a snap-in valve, the snap-in valve including a valve stem having a tube shape, and an elastic body covering the valve stem, the snap-in valve being inserted into a hole formed in a wheel for holding a tire, and being mounted to the wheel under a state in which the elastic body is compressed between the valve stem and the wheel, the replacement necessity determination device including an air pressure detection device, which is fixed to an inner end of the snap-in valve positioned in an air chamber formed by the wheel and the tire, the air pressure detection device including:

an air pressure sensor for detecting a pressure in the air chamber;

an acceleration sensor for detecting an acceleration of the wheel in a radial direction of the wheel; and a transmitter for wirelessly transmitting a signal representing the pressure detected by the air pressure sensor and a signal representing the acceleration detected by the acceleration sensor.

The replacement necessity determination device further includes a control device for receiving at least the signal representing the acceleration from the transmitter, the control device including:

rotational speed acquisition means for acquiring information on a rotational speed of the wheel;

angle change amount prediction means for predicting, based on the rotational speed and the acceleration of the wheel, a change amount of an angle of the snap-in valve and the air pressure detection device with respect to the wheel, which is generated in the radial direction by an elastic deformation of the elastic body from a position occupied by the snap-in valve and the air pressure detection device with respect to the wheel when the rotational speed of the wheel is at a reference rotational speed; and replacement necessity determination means for calculating a degradation indication value of the elastic body based on a maximum value of the change amount of the angle in a period set in advance when the wheel is rotating at a rotational speed more than the reference rotational speed, calculating an integrated value of the degradation indication value, and determining necessity of replacement of the snap-in valve based on the integrated value.

As described in detail later, the change amount of the angle of the snap-in valve and the air pressure detection device generated in the radial direction by the elastic deformation of the elastic body from the position occupied by the snap-in valve and the air pressure detection device with respect to the wheel when the rotational speed of the wheel is at the reference rotational speed can be predicted based on the rotational speed and the acceleration of the wheel. The maximum value of the change amount of the angle in the period set in advance during the rotation of the wheel corresponds to the stress applied to the elastic body of the snap-in valve, and hence the degradation indication value of the elastic body can be calculated based on the maximum value of the change amount of the angle. Further, the integrated value of the degradation indication value corresponds to an accumulation value of the stress applied to the elastic body of the snap-in valve, and a relationship between the accumulation value of the stress and a usable life of the elastic body can be acquired in advance. Thus, the necessity of the replacement of the snap-in valve can be determined based on the integrated value of the degradation indication value.

With the above-mentioned configuration, the change amount (θ) of the angle of the snap-in valve and the air pressure detection device caused by the elastic deformation of the elastic body around the valve stem and the resulting pivot motion is predicted based on the rotational speed and the acceleration of the wheel. Further, the degradation indication value of the elastic body is calculated based on the maximum value of the change amount of the angle in the period set in advance during the rotation of the wheel. The necessity of the replacement of the snap-in valve is determined based on the integrated value of the degradation indication value. Thus, the necessity of the replacement of the snap-in valve can be determined based on the relationship between the accumulated value of the stress applied to the elastic body of the snap-in valve and the usable life of the elastic body.

In one aspect of the present disclosure, the replacement necessity determination means is configured to determine that the snap-in valve needs to be replaced when the integrated value is more than an alarm reference value set in advance, and to generate an alarm notifying that the snap-in valve needs to be replaced.

According to the above-mentioned aspect, it is determined that the replacement of the snap-in valve is necessary when the integrated value is more than the alarm reference value set in advance, and the alarm notifying that the snap-in valve needs to be replaced is generated. Thus, an occupant of the vehicle can be prompted to replace the snap-in valve before the usable life of the elastic body is expired.

In another aspect of the present disclosure, the replacement necessity determination means is configured to determine that the snap-in valve needs to be replaced in a future when the integrated value is more than a preliminary announcement reference value, which is set in advance to a value less than the alarm reference value, and to generate a preliminary announcement that the replacement of the snap-in valve becomes necessary in the future.

According to the above-mentioned aspect, it is determined that the snap-in valve needs to be replaced in the future when the integrated value is more than the preliminary reference value set in advance to the value less than the alarm reference value, and the preliminary announcement that the replacement of the snap-in valve becomes necessary in the future is generated. Thus, the occupant of the vehicle can know that the replacement of the snap-in valve soon becomes necessary before the usable life of the elastic body is expired, and can prepare for the replacement of the snap-in valve.

In another aspect of the present disclosure, the rotational speed acquisition means is configured to calculate the rotational speed of the wheel based on an increase/decrease cycle of the acceleration.

According to the above-mentioned aspect, the rotational speeds of the wheel are calculated based on the increase/decrease cycle of the acceleration. Thus, the acceleration detected by the acceleration sensor provided for the air pressure detection device can effectively be used to acquire the rotational speeds of the wheel. Thus, a special wheel assembly speed detection device, e.g., a wheel assembly speed sensor, is not necessary, and hence the replacement necessity determination device can also be applied to a vehicle in which the wheel assembly speed sensor is not provided for each of the wheel assemblies.

Further, in another aspect of the present disclosure, the replacement necessity determination device for a snap-in valve further includes a wheel assembly speed sensor, which is provided on a wheel assembly including the wheel and the tire, for detecting a rotational speed of the wheel assembly, and the rotational speed acquisition means is configured to acquire information on the rotational speed from the wheel assembly speed sensor as the information on the rotational speed of the wheel.

According to the above-mentioned aspect, the information on the rotational speed is acquired from the wheel assembly speed sensor as the information on the rotational speed of the wheel. Thus, the rotational speed of the wheel can be calculated without necessity for the information on the acceleration detected by the acceleration sensor. The information on the acceleration detected by the acceleration sensor is wirelessly transmitted by the transmitter to the control device, and hence compared with the case where the rotational speed of the wheel is calculated based on the increase/decrease cycle of the acceleration, a transmission frequency of the information on the acceleration by the transmitter can be decreased, thereby decreasing an electrical energy amount consumed by the transmitter.

Other objects, other features, and accompanying advantages of the present disclosure can be readily understood from a description of the embodiments of the present disclosure to be given referring to the accompanying drawings.

DETAILED DESCRIPTION

Now, with reference to the accompanying drawings, some preferred embodiments of the present disclosure are described in detail.

[First Embodiment]

Figure 1:
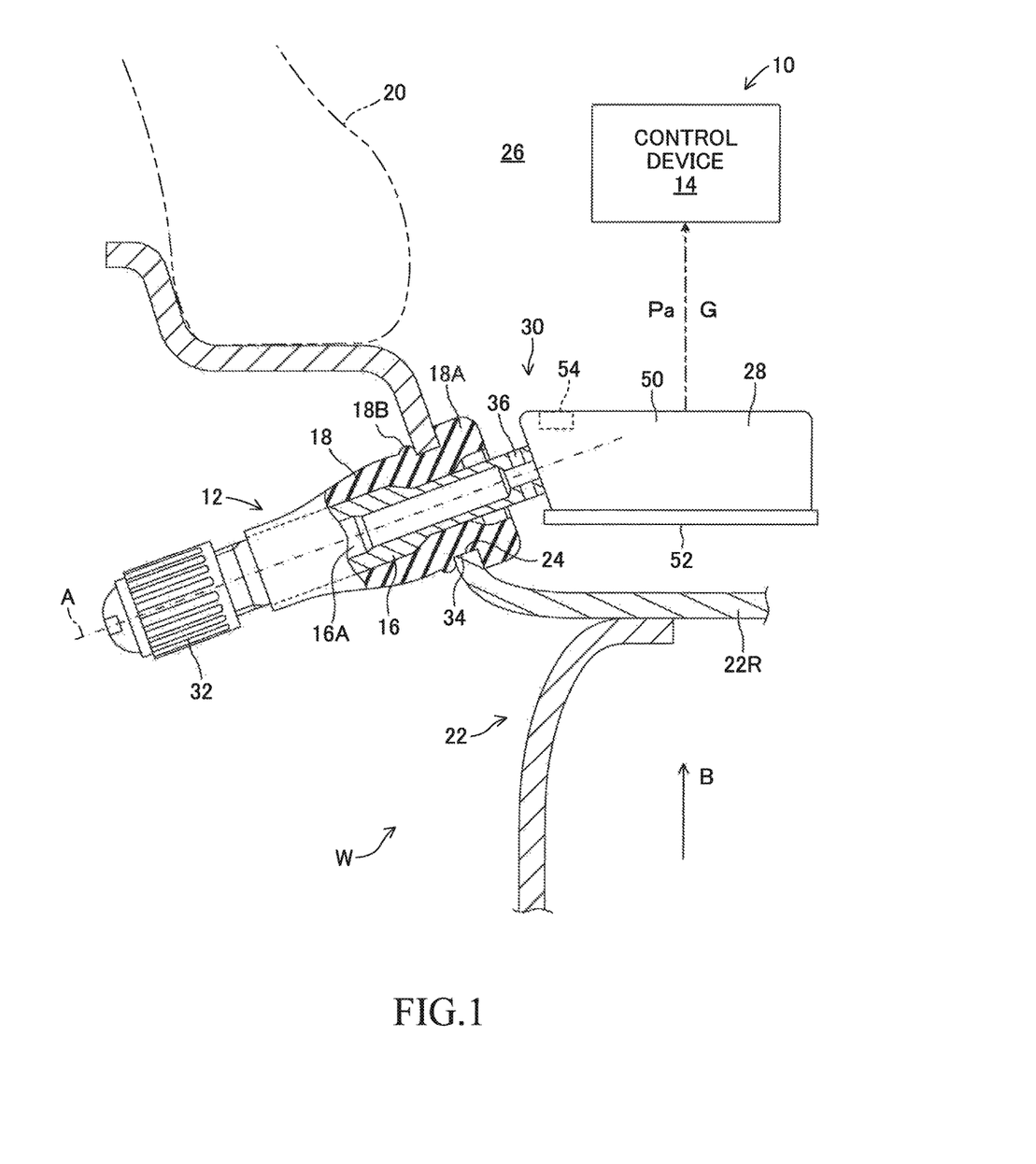
FIG. 1 is a schematic configuration diagram for illustrating a replacement necessity determination device for a snap-in valve according to a first embodiment of the present disclosure.
Figure 2:
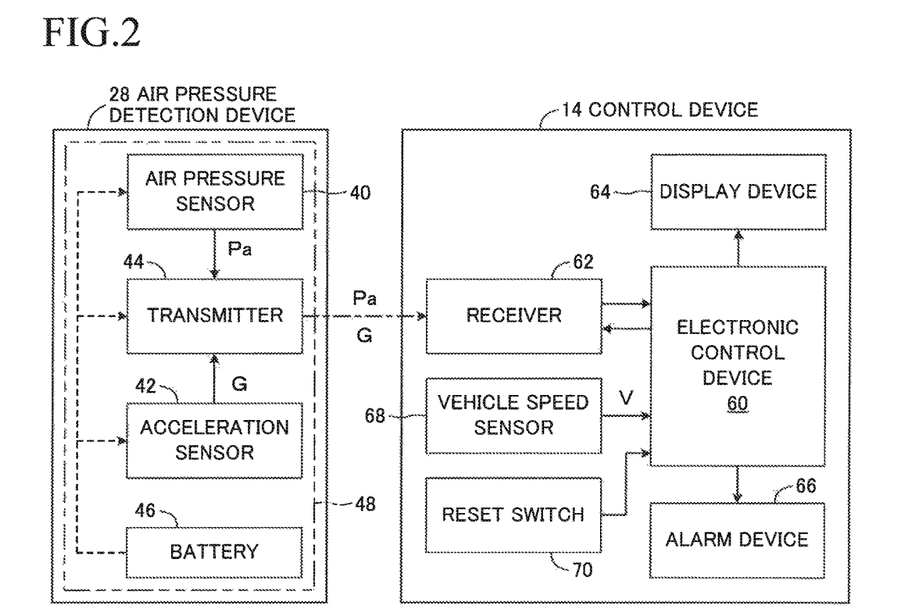
FIG. 2 is a block diagram for illustrating the replacement necessity determination device illustrated in FIG. 1.

A replacement necessity determination device 10 illustrated in FIG. 1, which is a schematic configuration diagram, and FIG. 2, which is a block diagram, includes a control device 14 for determining replacement necessity for a snap-in valve 12. The snap-in valve 12 includes a valve stem 16 having a tubular shape extending along an axis A, and an elastic body 18 covering an entire periphery of a region except for both ends of the valve stem 16. The valve stem 16 is formed of metal. The elastic body 18 is formed of rubber. The valve stem 16 may be formed of rigid plastic, and the elastic body 18 may be formed of resin. In each wheel assembly W of a vehicle (not shown), one snap-in valve 12 is installed on a metal wheel 22 for retaining a tire 20 on an outer periphery thereof, but the control device 14 is installed in a vehicle body of the vehicle as one control device common to the plurality of snap-in valves 12.

As illustrated in FIG. 1, the snap-in valve 12 is mounted to a rim portion 22R of the wheel 22 under a state in which the snap-in valve 12 is inserted through a hole 24 formed in the rim portion 22R and the elastic body 18 is compressed at least in a radial direction between the valve stem 16 and the rim portion 22R. An air chamber 26, which is a sealed space, is formed by the rim portion 22R and the tire 20. An inner end of the valve stem 16 and an inner end of the elastic body 18 are positioned in the air chamber 26. An air pressure detection device 28 is integrally coupled to the inner end of the valve stem 16 in the air chamber 26. The snap-in valve 12 and the air pressure detection device 28 form a valve unit 30.

The valve stem 16 includes an air passage 16A for connecting the atmosphere and the air chamber 26 to each other. A valve structure (not shown) is arranged in a region of the air passage 16A close to an outer end of the valve stem 16. The valve structure is configured to basically permit communication of the air from the atmosphere side to the air chamber 26 via the air passage 16A, and block the communication of the air in the opposite direction, but permit the communication of the air in the opposite direction when a predetermined operation is carried out on the valve structure. A cap 32 is screwed over the outer end of the valve stem 16, thereby closing the outer end of the snap-in valve 12.

The elastic body 18 has a tapered shape whose outer diameter decreases toward the outer end of the valve stem 16. A larger diameter portion 18A is provided on the inner end of the elastic body 18. The larger diameter portion 18A is positioned in the air chamber 26. An annular groove 34 to be fit to the hole 24 formed in the rim portion 22R is formed at a position next to the larger diameter portion 18A. An annular protrusion 18B is provided on a side opposite to the larger diameter portion 18A with respect to the annular groove 34, that is, on the outer end side of the valve stem 16.

An outer diameter of an outer end portion of the elastic body 18 is less than an inner diameter of the hole 24, and an outer diameter of a bottom surface of the annular groove 34 is slightly more than the inner diameter of the hole 24 under a free state in which the snap-in valve 12 is not mounted to the rim portion 22R. An outer diameter of the annular protrusion 18B is more than the outer diameter of the bottom surface of the annular groove 34, and is less than an outer diameter of the larger diameter portion 18A. An interval between surfaces opposing each other of the larger diameter portion 18A and the annular protrusion 18B is equal to or slightly less than a thickness of the rim portion 22R around the hole 24. The larger diameter portion 18A and the annular protrusion 18B extend over an entire periphery about the axis A, but may intermittently extend about the axis A.

The valve unit 30 is mounted to the rim portion 22R of the wheel 22 on each wheel assembly W as described below. The outer end of the snap-in valve 12 is inserted into the hole 24 from an inside (side corresponding to the air chamber 26) of the rim portion 22R under a state in which the tire 20 is removed from the rim portion 22R. Then, the valve unit 30 is relatively moved with respect to the rim portion 22R to a predetermined mounting position at which a portion around the hole 24 of the rim portion 22R is fit into the annular groove 34 while the elastic body 18 is compressed and deformed inward in the radial direction.

When the valve unit 30 is moved to the predetermined mounting position, the elastic body 18 is compressed in the radial direction between the valve stem 16 and the rim portion 22R in a region inside in the radial direction of the annular groove 34, and the bottom surface of the annular groove 34 is thus pressed against a wall surface of the hole 24, and is brought into close contact with the wall surface. The surfaces of the larger diameter portion 18A and the annular protrusion 18B opposing each other are respectively also brought into close contact with an outer surface and an inner surface of a portion around the hole 24 of the rim portion 22R. Thus, the valve unit 30 is held at the predetermined mounting position by the elastic body 18 so that the axis A extends vertically with respect to a plate surface of the rim portion 22R. The elastic body 18 can elastically deform, and the snap-in valve 12 can thus be tilted relatively with respect to the rim portion 22R under a state in which, for example, the compressed air is introduced into the air chamber 26 via the snap-in valve 12.

When the tire 20 is mounted to the rim portion 22R of the wheel 22, and the compressed air is introduced into the air chamber 26 via the snap-in valve 12 so that the air pressure of the tire 20, namely, the pressure in the air chamber 26, reaches a predetermined pressure, a differential pressure is generated between the air chamber 26 and the atmosphere. As long as the valve unit 30 is held at the predetermined mounting position, the bottom surface of the annular groove 34 of the elastic body 18 maintains the state in which the bottom surface is pressed against the wall surface of the hole 24, and the air chamber 26 is thus maintained in an airtight state. Thus, the high pressure in the air chamber 26 is prevented from leaking to the atmosphere via a gap between the snap-in valve 12 and the rim portion 22R. Moreover, the outer surface of the larger diameter portion 18A opposing the rim portion 22R is maintained in the state in which the outer surface is brought into close contact with the inner surface of the peripheral portion of the hole 24 of the rim portion 22R. Thus, the valve unit 30 is prevented from moving relatively to the rim portion 22R so as to be replaced from the predetermined mounting position by the differential pressure between the air chamber 26 and the atmosphere.

According to the illustrated embodiment, the air pressure detection device 28 is separated from the larger diameter portion 18A of the elastic body 18 in the direction along the axis A. A plurality of communication holes 36 for connecting between the air passage 16A and the air chamber 26 are formed in the valve stem 16 between the air pressure detection device 28 and the larger diameter portion 18A. The air pressure detection device 28 may abut against or adhered to the inner end of the snap-in valve 12 and the valve stem 16 may pass through the air pressure detection device 28 so that the air passage 16A may be connected to the air chamber 26 directly or via a hole formed in the air pressure detection device 28.

As illustrated in FIG. 2, the air pressure detection device 28 includes an air pressure sensor 40, an acceleration sensor 42, a transmitter 44, and a battery 46, which are integrated into a detection unit 48. The air pressure sensor 40 is configured to detect the pressure in the air chamber 26, namely, a tire air pressure Pa. The acceleration sensor 42 is configured to detect a force acting on an inertia weight (not shown), thereby detecting an acceleration G in the radial direction of the wheel 22. The transmitter 44 is configured to wirelessly transmit a signal representing the tire air pressure Pa and a signal representing the acceleration G detected by the acceleration sensor 42 at a timing set in advance. Further, the battery 46 is configured to supply the air pressure sensor 40, the acceleration sensor 42, and the transmitter 44 with currents required for operations thereof.

When the wheel assembly W is not rotating, the acceleration G in the radial direction of the wheel 22 generated by the rotation of the wheel assembly W is not detected by the acceleration sensor 42, and hence the acceleration sensor 42 functions as means for determining whether or not the wheel assembly W is rotating for the detection of the tire air pressure Pa. The air pressure sensor 40 is configured to detect the tire air pressure Pa only when the rotation of the wheel assembly is detected based on the acceleration G detected by the acceleration sensor 42. Thus, an unnecessary operation of the air pressure sensor 40 is prevented, resulting in a decrease in consumption of electric energy stored in the battery 46.

This detection unit 48 is stored in a plastic housing 50 illustrated in FIG. 1. A lid member 52 having a flat plate shape is mounted to an opening on a bottom surface of the housing 50. The inner end of the valve stem 16 is inserted into a hole formed on the housing 50, and is detachably fixed to the housing 50 by using a fixing device 54, e.g., a clamp or a screw, which is not illustrated in detail in FIG. 1. Thus, the air pressure detection device 28 may be detached from the snap-in valve 12 by releasing the fixation provided by the fixing device 54 depending on necessity, e.g., maintenance. Moreover, only a snap-in valve 12 that is, for example, secularly degraded, is replaced by a new snap-in valve 12, and the air pressure detection device 28 can be mounted to the new snap-in valve 12, thereby reusing the air pressure detection device 28.

In order to facilitate adjustment of the pressure in the air chamber 26, the outer end of the snap-in valve 12 is positioned inward in the radial direction of the wheel 22 with respect to the inner end thereof, and thus, the axis A extends while inclined with respect to a direction perpendicular to the radial direction B of the wheel 22. The detection unit 48 substantially forms a flat plate shape extending in a direction perpendicular to the drawing sheet of FIG. 1. The detection unit 48 has a reference surface (not shown) parallel with the lid member 52. The reference surface of the detection unit 48 is perpendicular to the radial direction B of the wheel 22, and extends in the direction perpendicular to the drawing sheet of FIG. 1 so that a detection direction of the acceleration by the acceleration sensor 42 is the radial direction B of the wheel 22.

The weight of the air pressure detection device 28 is more than the weight of the snap-in valve 12, and the center of gravity of the valve unit 30 is thus positioned on the inner end side of the snap-in valve 12 with respect to the annular groove 34 of the elastic body 18. Thus, when the valve unit 30 is at the predetermined mounting position, the center of gravity of the valve unit 30 is positioned in the air chamber 26. The gravity as well as a centrifugal force generated by the rotation of the wheel 22 acts on the center of gravity of the valve unit 30.

While the centrifugal force always acts outward in the radial direction of the wheel 22, the gravity acts downward independently of a rotational position of the wheel 22, that is, independently of the position of the valve unit 30 with respect to a rotational axis (not shown) of the wheel 22. Thus, when the wheel 22 rotates, the force acting on the center of gravity of the valve unit 30 cyclically varies each rotation of the wheel 22 independently of the rotational speed thereof, and the acceleration G detected by the acceleration sensor 42 also cyclically varies each rotation of the wheel 22. Thus, the rotation cycle T of the wheel 22 can be acquired by acquiring the cycle of the acceleration G.

The valve unit 30 inclines so that while a neighborhood of the annular groove 34 of the elastic body 18 serves as a pivot point, the air pressure detection device 28 is displaced outward in the radial direction of the wheel 22 compared with the case where the wheel 22 is stationary, and presents a precession (wobbling) by the force acting on the center of gravity of the valve unit 30 and cyclically varying. When the motion of the valve unit 30 is viewed on a cross section (cross section illustrated in FIG. 1) in the radial direction of the wheel 22, the valve unit 30 cyclically pivots about the pivot point as the wheel 22 rotates. The cycle of the pivot of the valve unit 30 is the same as the rotation cycle of the wheel 22.

Figure 3:
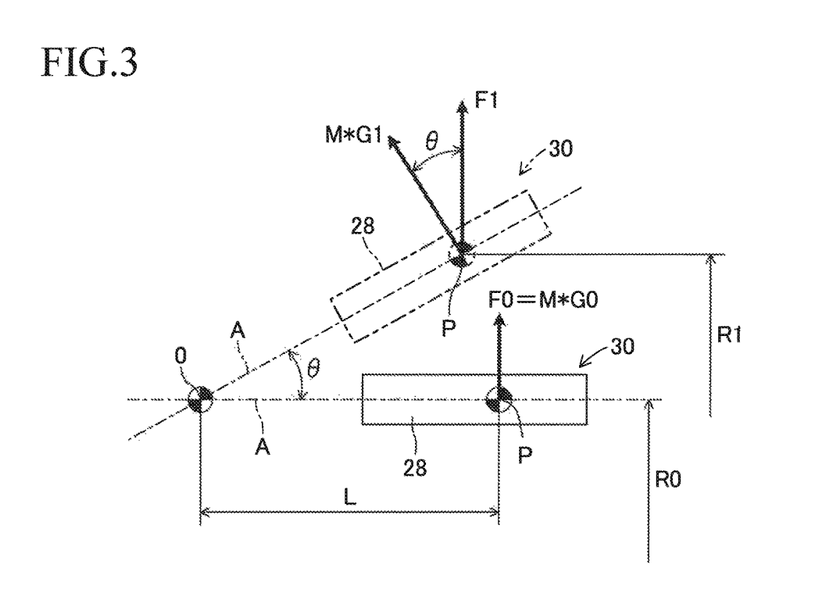
FIG. 3 is a diagram for illustrating how to predict an angle change amount θ of a valve unit caused by a rotation of a wheel according to the first embodiment.

When a position represented by the solid lines in FIG. 3, that is, a position of the valve unit 30 while the wheel 22 is stationary is considered as a reference position, an angle change amount (angle of the pivot) 8 with respect to the reference position of the valve unit 30 is proportional to the magnitude of the force acting outward in the radial direction on the center of gravity of the valve unit 30. In other words, the angle change amount θ is a change amount of the angle of the valve unit 30 with respect to the wheel 22 in the radial direction caused by the elastic deformation of the elastic body from the position occupied by the valve unit 30 with respect to the wheel 22 while the wheel 22 is stationary. Thus, the angle change mount 8 takes the maximum value when the gravity acting on the center of gravity of the valve unit 30 is outward in the radial direction of the wheel 22, that is, the valve unit 30 is at the lowest position in its rotational movement range, and takes the minimum value when the valve unit 30 is at the highest position in its rotational movement range.

FIG. 3 is an explanatory diagram for schematically illustrating positions of the air pressure detection device 28 when the angle change amount θ of the valve unit 30 is 0 and a positive value respectively as the solid lines and the long dash double-short dashed lines. In FIG. 3, a point O denotes the pivot point of the valve unit 30, and a point P denotes an acceleration detection point (e.g., mass center of the inertia weight (not shown)) of the acceleration sensor 42 provided in the air pressure detection device 28.

As illustrated in FIG. 3, the distance between the acceleration detection point P of the acceleration sensor 42 and the pivot point O is denoted by L. Distances (namely, rotational radii of the acceleration detection point P) from the rotational axis (rotational axis (not shown) of the wheel assembly W) of the wheel 22 to the acceleration detection point P are respectively denoted by R0 and R1 when the angle change amount θ is 0 and the positive value. The centrifugal forces acting on the inertia weight of the acceleration sensor 42 are respectively denoted by F0 and F1, and the accelerations detected by the acceleration sensor 42 are respectively denoted by G0 and G1 when the angle change amount θ is 0 and the positive value. Further, the mass of the inertia weight of the acceleration sensor 42 is denoted by M.

The centrifugal forces F0 and F1 are respectively represented as Equation (1) and Equation (2), where rotational angular velocities about the rotational axis of the wheel 22 are respectively denoted by ω0 and ω1 when the angle change amount θ is 0 and the positive value. A relationship represented as Equation (3) exists between the centrifugal force F0 and the acceleration G0. A relationship represented as Equation (4) exists between the centrifugal force F1 and the acceleration G1.

$$F0 = R0 \cdot \omega0^2 \tag{1}$$

$$F1 = R1 \cdot \omega1^2 \tag{2}$$

$$F0 = M \cdot G0 \tag{3}$$

$$F1 \cdot \cos\theta = M \cdot G1 \tag{4}$$

As appreciated from FIG. 3, a relationship represented as Equation (5) holds true between the distance L and the rotation radii R0 and R1 of the acceleration detection point P.

$$L \cdot \sin\theta = R1 - R0 \tag{5}$$

Equation (6) holds true from Equation (1) to Equation (5). sin θ can be rewritten as $(1-\cos^2\theta)^{1/2}$, and hence Equation (6) can be transformed into a function of cos θ as represented as Equation (7).

$$L \cdot \sin\theta = M \cdot G1/(\omega1^2 \cdot \cos\theta) - M \cdot G0/\omega0^2 \tag{6}$$

$$L^2 \cdot \cos^4\theta + (M \cdot G0/\omega0^4 - L^2)\cos^2\theta$$

$$-2M^2 \cdot \{G0 \cdot G1/(\omega0^2 \cdot \omega1^2)\} \cdot \cos\theta + M^2 \cdot G1^2/\omega1^4 = 0 \tag{7}$$

On this occasion, a cycle of the rotation of the acceleration sensor 42 about the rotational axis of the wheel 22 when the valve unit 30 is maintained at the reference position is denoted by T0, and a cycle of the rotation of the acceleration sensor 42 about the rotational axis of the wheel 22 when the angle change amount θ is the positive value is denoted by T1. The rotational angular velocities ω0 and ω1 of the wheel 22 are respectively represented as Equation (8) and Equation (9).

$$\omega0 = 2\pi/T0 \tag{8}$$

$$\omega1 = 2\pi/T1 \tag{9}$$

In Equation (7), the distance L and the mass M of the inertia weight are known values, and the accelerations G0 and G1 are values detected by the acceleration sensor 42. Further, the rotational angular velocities ω0 and ω1 of the wheel 22 are values calculated respectively based on the rotation cycles T0 and T1 of the wheel 22 in accordance with Equation (8) and Equation (9). Thus, the angle change amount θ of the valve unit 30 can be acquired by solving Equation (7) in terms of cos θ. θ is a value equal to or more than 0 and less than 90°. cos θ is thus a value that is more than 0 and equal to or less than 1.

When the valve unit 30 receives the repeatedly varying force F1 and repeatedly pivots, a portion around the annular groove 34 of the elastic body 18 repeatedly deforms, and hence the snap-in valve 12 repeatedly receives stress causing degradation. The angle change amount θ of the angle of the pivot of the valve unit 30 corresponds to a degree of the stress received by the snap-in valve 12 caused by the force F1. As the degree of the stress increases, the progress of the secular degradation of the elastic body 18 increases, and the usable life of the snap-in valve 12 decreases. Thus, the maximum value θ max of the angle change amount θ in a predetermined period set in advance is an indication of the stress received by the snap-in valve 12. Thus, according to the embodiment, a degradation indication value Id of the snap-in valve 12 is calculated based on the maximum value θ max by referring to Table 1 set in advance.

The angle change amount θ of the valve unit 30 is acquired in accordance with Equation (7) while assuming that the elastic modulus of the elastic body 18 is constant. The elastic modulus of an elastic body, e.g., rubber, gradually decreases as the elastic body degrades, and the elastic body gradually hardens. Thus, the actual angle change amount of the valve unit 30 becomes less than the angle change amount θ acquired in accordance with Equation (7).

TABLE 1

| θmax | Id |
|---|---|
| 0° or more and less than 15° | 0 |
| 15° or more and less than 20° | 100 |
| 20° or more and less than 25° | 320 |
| 25° or more and less than 30° | 1,000 |

In Table 1, the degradation indication value Id is set so that a ratio of the degradation indication value Id to the maximum value θ max of the angle change amount θ increases as the maximum value θ max increases. The setting of the degradation indication value Id corresponds to a fact that a degradation period of the elastic body 18, namely, the usable life of the snap-in valve 12 is an exponential function of the number of repetitions of the deformation of the elastic body 18 that causes the secular degradation of the elastic body 18. Numerical values of Table 1 are example values, and the degradation indication value Id is not limited to the values of Table 1, and may be appropriately set depending on the valve unit 30 to which the replacement necessity determination device 10 according to the present disclosure is applied, in particular, a material of the elastic body 18.

Further, an integrated value Idin of the degradation indication value Id of the snap-in valve 12 is calculated, and the necessity of the replacement of the snap-in valve 12 is determined depending on determination as to whether or not the integrated value Idin is more than a reference value Idinc (positive constant integer, e.g., 1,000,000) set in advance. When the replacement of the snap-in valve 12 is determined to be necessary, an alarm notifying that the replacement of the snap-in valve 12 is necessary is displayed on a display device 64 described later.

As illustrated in FIG. 2, the control device 14 includes an electronic control device 60, a receiver 62, the display device 64, and an alarm device 66. The valve unit 30 is installed on each of the wheel assemblies W of the vehicle as described above, but only one valve unit 30 is illustrated in FIG. 2. An ID number for identifying each of the air pressure detection devices 28 is assigned to each thereof. The receiver 62 is configured to receive a signal of the ID number as well as signals representing the tire air pressure Pa and the acceleration G detected respectively by the air pressure sensor 40 and the acceleration sensor 42 from the transmitter 44 of each of the wheel assemblies, and transmit those signals to the electronic control device 60.

Further, to the electronic control device 60, a signal representing a vehicle speed V detected by a vehicle speed sensor 68, namely, a travel speed of the vehicle is input, and a signal representing whether or not a reset switch 70 is operated is input from the switch 70. When the reset switch 70 is operated, a flag Fa described later is reset to 0, and parameters, e.g., the accumulation value Idin of the degradation indication value Id, are each initialized to 0.

Figure 4:
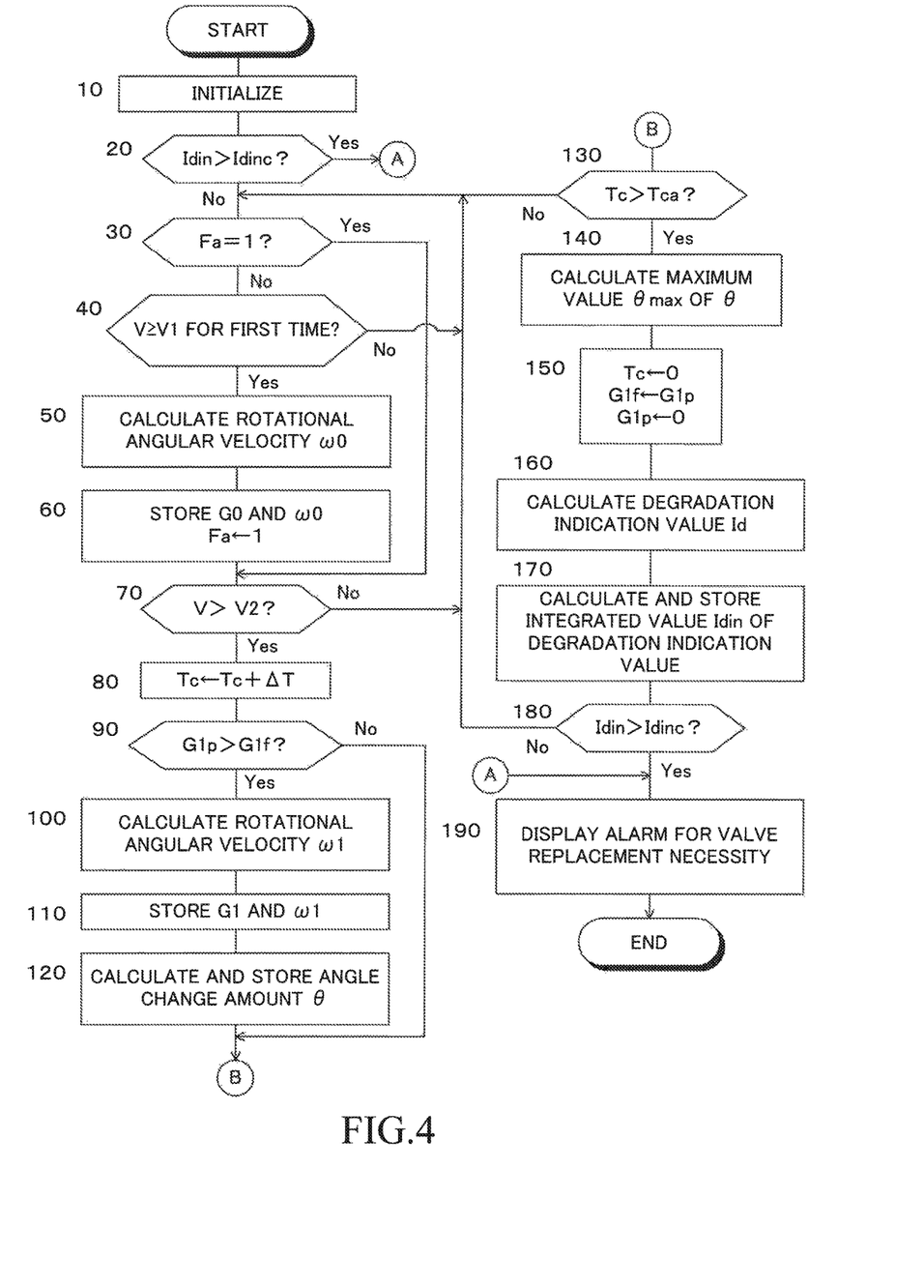
FIG. 4 is a flowchart for illustrating a determination control routine for replacement necessity for a snap-in valve according to the first embodiment.

The electronic control device 60 is configured to determine the necessity of the replacement of the snap-in valve 12 based on the acceleration G and the vehicle speed V in accordance with a control program corresponding to a flowchart illustrated in FIG. 4, and display a determination result on the display device 64. Further, the electronic control device 60 is configured to determine whether or not the tire air pressure Pa is equal to or less than a reference value, and operate the alarm device 66 to generate an alarm notifying that the tire air pressure Pa is abnormal when the tire air pressure Pa is equal to or less than the reference value. The control relating to the determination for the tire air pressure Pa does not relate to the gist of the present disclosure, and hence a further description of the determination for the tire air pressure Pa is omitted.

The electronic control device 60 may be, for example, a microcomputer including a CPU, a ROM, a RAM, a backup memory, and an input/output port device connected to each other via a bidirectional common bus. The control program is stored in the ROM, and the determination of the necessity of the replacement and the display of the determination are controlled by the CPU in accordance with the control program. The alarm displayed by the display device 64 and the alarm generated by the alarm device 66 may be one of alarms visually recognized and alarms aurally recognized, or both of the alarms visually recognized and the alarms aurally recognized. Particularly in the latter case, it is preferred that the alarms visually recognized be always displayed while the alarms aurally recognized are generated at a particular timing, e.g., a start of driving.

Referring to the flowchart illustrated in FIG. 4, a description is now given of a control routine for the replacement necessity determination for the snap-in valve 12 according to the first embodiment. The control in accordance with the flowchart illustrated in FIG. 4 is repeatedly carried out after every predetermined period for the snap-in valve 12 for each of the wheel assemblies W in a sequence of, for example, a front left wheel assembly, a front right wheel assembly, a rear left wheel assembly, and a rear right wheel assembly while an ignition switch (not shown) is turned on. In the following description, the control for the replacement necessity determination in accordance with the flowchart is simply referred to as "control".

First, in Step 10, the flag Fa described later is reset to 0, and parameters other than the integrated value Idin of the degradation indication value Id are cleared so as to initialize the parameters. For example, a previous value G1f, which is described later, of the acceleration G detected by the acceleration sensor 42, the degradation indication value Id of the snap-in valve 12, and a count Tc of a timer are each initialized to 0. The flag Fa is a flag relating to whether or not the reference acceleration G0 and the reference rotational angular velocity ω0 are already stored in the RAM. The flag Fa and all the parameters, e.g., the integrated value Idin, are each initialized to 0 when the vehicle is shipped and when the reset switch 70 is operated.

In Step 20, it is determined whether or not the integrated value Idin of the degradation indication value Id is more than the reference value Idinc, that is, it is determined whether or not the replacement of the snap-in valve 12 is necessary. When an affirmative determination is made, the control proceeds to Step 190, and when a negative determination is made, the control proceeds to Step 30.

In Step 30, it is determined whether or not the flag Fa is 1, that is, it is determined whether or not the reference acceleration G0 and the reference rotational angular velocity ω0 are already stored in the RAM. When an affirmative determination is made, the control proceeds to Step 70, and when a negative determination is made, the control proceeds to Step 40.

In Step 40, it is determined whether or not the vehicle speed V becomes equal to or more than a reference vehicle speed V1 (positive constant, e.g., 30 km/h) for the first time after the ignition switch is turned on. When a negative determination is made, the control returns to Step 30, and when an affirmative determination is made, the control proceeds to Step 50. The valve unit 30 substantially remains at the reference position until immediately after the vehicle speed V increases from 0 to a value equal to or more than the reference vehicle speed V1, and hence the angle change amount θ is 0 or a minute value close to 0.

In Step 50, the cycle T0 in which the acceleration sensor 42 rotates about the rotational axis of the wheel 22 is calculated under the state in which the valve unit 30 is substantially at the reference position based on the cycle of the cyclic variation of the acceleration G detected by the acceleration sensor 42. Further, the rotational angular velocity ω0 of the wheel 22 is calculated in accordance with Equation (8) based on the cycle T0.

In Step 60, the acceleration G detected by the acceleration sensor 42 is stored as the reference acceleration G0 in the RAM. The reference rotational angular velocity ω0 of the wheel 22 calculated in Step 40 is also stored in the RAM. Further, the flag Fa is set to 1.

In Step 70, it is determined whether or not the vehicle speed V is more than a reference value V2. When a negative determination is made, the control returns to Step 30, and when an affirmative determination is made, the control proceeds to Step 80. The reference value V2 is a positive constant equal to or more than the reference vehicle speed V1.

In Step 80, the count Tc of the timer is counted up by ΔT, which is a cycle time of the control of the flowchart illustrated in FIG. 4. In other words, an integrated period in a state in which the vehicle speed V is more than the reference value V2 is measured.

In Step 90, the accelerations of the current cycle and the previous cycle out of the accelerations G detected by the acceleration sensor 42 are respectively denoted by G1$p$ and G1$f$, and it is determined whether or not G1$p$ is more than G1$f$. When a negative determination is made, the control proceeds to Step 130, and when an affirmative determination is made, the control proceeds to Step 100. Meaning of the determination in this step is described later.

In Step 100, the current rotational angular velocity ω1 of the wheel 22 is calculated in accordance with Equation (9) in the same manner as in the calculation of the rotational angular velocity ω0 of the wheel 22 in Step 40.

In Step 110, the acceleration G detected by the acceleration sensor 42 is stored as the current acceleration G1 in the RAM. The current rotational angular velocity ω1 of the wheel 22 calculated in Step 100 is also stored in the RAM.

In Step 120, the rotational angular velocities ω0 and ω1 and the accelerations G0 and G1 of the wheel 22 stored in the RAM are assigned into Equation (7), and the angle change amount θ of the valve unit 30 is calculated by solving Equation (7) in terms of cos θ. Further, data on the angle change amount θ when G1$p$ is more than G1$f$ is accumulated in the RAM by storing the angle change amount θ in the RAM.

In Step 130, it is determined whether or not the count Tc of the timer is more than a reference value Tca (positive constant). When a negative determination is made, the control returns to Step 30, and when an affirmative determination is made, the control proceeds to Step 140. The reference value Tca may be set to a period, e.g., 2 minutes to 10 minutes, typically 5 minutes, which is appropriate for sampling a change in vehicle speed when the vehicle travels on a general public road.

In Step 140, the maximum value of the angle change amounts θ of the valve unit 30 during a past period Tca until the current time point that are stored in the RAM is calculated as the maximum value θ max of the angle change amount θ.

In Step 150, the count Tc of the timer is reset to 0. Further, the acceleration G1$p$ of the current cycle, namely, the acceleration G1 stored in the RAM at the time point when the affirmative determination is made in Step 130 is again stored in the RAM as the acceleration G1$f$ in the previous cycle, and the acceleration G1$p$ in the current cycle is written to 0 and is again stored in the RAM.

In Step 160, the degradation indication value Id of the snap-in valve 12 is calculated by referring to Table 1 based on the maximum value θ max.

In Step 170, a value Idinf+Id, which is acquired by adding the degradation indication value Id for the current time calculated in Step 160 to a previous value Idinf of the integrated value Idin of the degradation indication value Id of the snap-in valve 12, is calculated as the integrated value Idin of the degradation indication value Id. Further, the integrated value Idin is stored in the backup memory.

In Step 180, in the same manner as in Step 20, it is determined whether or not the integrated value Idin of the degradation indication value Id is more than the reference value Idinc, that is, it is determined whether or not the replacement of the snap-in valve 12 is necessary. When a negative determination is made, the control returns to Step 30, and when an affirmative determination is made, the control proceeds to Step 190.

In Step 190, the alarm notifying that the replacement of the snap-in valve 12 is necessary is displayed on the display device 64 together with the ID number of the air pressure detection device 28. As a result, an occupant of the vehicle is attracted to the state in which the replacement of the snap-in valve 12 is necessary.

As appreciated from the description given above, the acceleration sensor 42 and Step 50 of FIG. 4 function as rotational speed acquisition means for acquiring the information on the rotational speed of the wheel 22. The acceleration sensor 42 and Step 50 to Step 100 of FIG. 4 function as angle change amount prediction means for predicting the change amount θ of the mounting angle of the snap-in valve 12 and the air pressure detection device 28 generated by the elastic deformation of the elastic body 18. Further, Step 70 to Step 180 of FIG. 4 function as replacement necessity determination means for calculating the degradation indication value Id of the elastic body based on the maximum value of the change amount θ of the mounting angle, calculating the integrated value Idin of the degradation indication value Id, and determining the necessity of the replacement of the snap-in valve based on the integrated value.

<Case where Replacement of Snap-in Valve 12 is not Necessary>

First, in Step 20, the negative determination is made. When the reference acceleration G0 and the reference rotational angular velocity ω0 are stored in the RAM, in Step 30, the affirmative determination is made, and as a result, Step 70 to Step 180 are repeatedly carried out. Thus, the alarm notifying that the replacement of the snap-in valve 12 is necessary is not displayed on the display device 64.

<Case where Replacement of Snap-in Valve 12 is Necessary>

In Step 20, the negative determination is made, in Step 30, the affirmative determination is made, and Step 70 to Step 170 are carried out. Then, in Step 180, the affirmative determination is made. Thus, in Step 190, the alarm notifying that the replacement of the snap-in valve 12 is necessary is displayed on the display device 64.

<Case where Snap-in Valve 12 Needs to be Replaced, but is not Replaced>

The integrated value Idin of the degradation indication value Id is stored in the backup memory, and hence in Step 20, the affirmative determination is made. Then, in Step 190, the alarm notifying that the replacement of the snap-in valve 12 is necessary is displayed on the display device 64. This alarm is displayed when the ignition switch is turned on even after the ignition switch is once turned off.

<Case where Snap-in Valve 12 is Replaced>

When the replacement of the snap-in valve 12 is completed, the reset switch 70 is operated by a maintenance person, and the parameters, e.g., the integrated value Idin of the degradation indication value Id, are thus each initialized to 0. Thus, when the control for the replacement necessity determination is started in accordance with the flowchart illustrated in FIG. 4 after the snap-in valve 12 is replaced, the negative determination is made in Step 20, and the control staring from Step 30 is carried out.

When not only the snap-in valve 12 is replaced, but the valve unit 30 is replaced, the ID number of the air pressure detection device 28 is a number different from the number that has been recognized by the electronic control device 60. Although not shown, when the electronic control device 60 recognizes an ID number different from the ID number that has been recognized, the electronic control device 60 determines that the snap-in valve 12 is replaced, and initializes the parameters, e.g., the integrated value Idin, to 0. Thus, even when the reset switch 70 is not operated by the maintenance person, required initialization of the parameters is carried out.

According to the first embodiment, when the secular degradation elastic body 18 of the snap-in valve 12 progresses, and the state in which the replacement of the snap-in valve 12 is necessary is brought about, the alarm notifying that the replacement of the snap-in valve 12 is necessary is displayed on the display device 64. Thus, the occupant of the vehicle can recognize that the replacement of the snap-in valve 12 is necessary through the alarm displayed on the display device 64.

In particular, according to the first embodiment, the rotational angular velocities $\omega 0$ and $\omega 1$ of the wheel 22, which are the rotational speeds of the wheel assembly W, are calculated in the same calculation form based on the acceleration G detected by the acceleration sensor 42, and the accelerations G0 and G1 are the values detected by the acceleration sensor 42. Then, the angle change amount θ of the valve unit 30 is calculated based on those values. Thus, compared with a case described in Japanese Patent Application Laid-open No. 2005-170224 where one of the accelerations to be compared with each other is detected by the acceleration sensor and the other is detected by differentiation based on a wheel assembly speed, a fear for inaccurate determination of the replacement timing of the valve caused by an error in the calculation and the like can be decreased.

Further, the acceleration sensor is also provided for the related-art valve unit, and the acceleration sensor is used to detect the tire air pressure only when the wheel assembly rotates and to wirelessly transmit a signal representing a detection value. According to the first embodiment, the rotational angular velocities $\omega 0$ and $\omega 1$ of the wheel 22 are calculated based on the acceleration G detected by the acceleration sensor 42. The acceleration G detected by the acceleration sensor 42 can effectively be used to acquire the rotational speed of the wheel assembly. Moreover, a special wheel assembly speed detection device, e.g., a wheel assembly speed sensor, is not necessary, and hence the replacement necessity determination device 10 according to the first embodiment can also be applied to a vehicle on which the wheel assembly speed sensor is not provided for each of the wheel assemblies.

[Second Embodiment]

Figure 5:
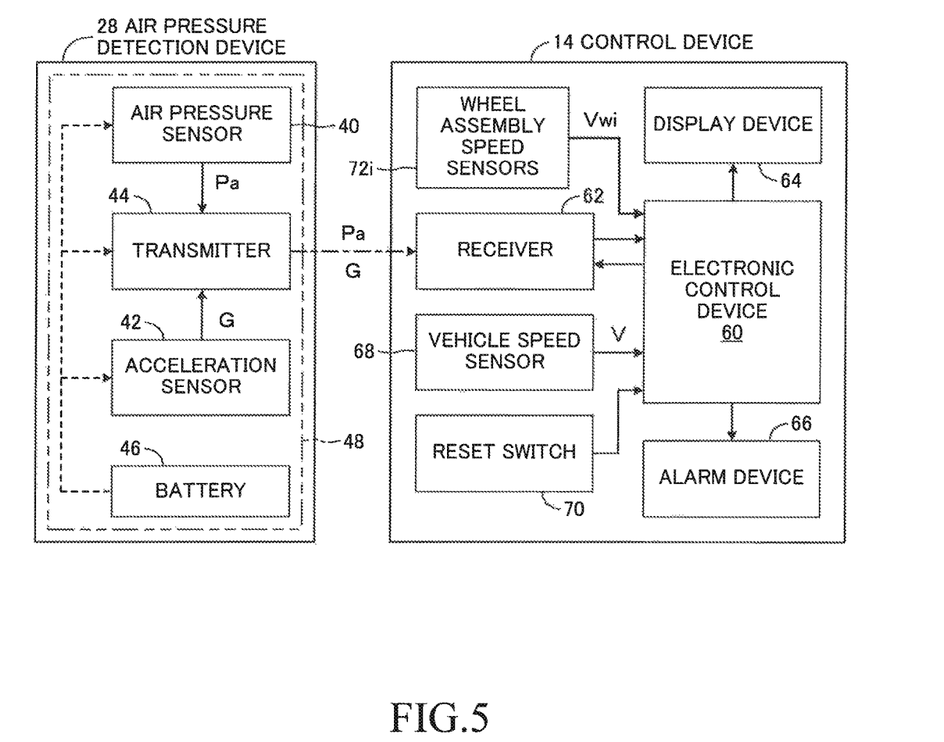
FIG. 5 is a block diagram for illustrating a replacement necessity determination device for a snap-in valve according to a second embodiment of the present disclosure.

FIG. 5 is a block diagram of the replacement necessity determination device 10 according to a second embodiment of the present disclosure. In FIG. 5, the same components as the components illustrated in FIG. 2 are denoted by the same reference symbols as those assigned in FIG. 2.

According to the second embodiment, wheel assembly speeds Vwi [rpm] (i=fl, fr, rl, and rr) of the front left, front right, rear left, and rear right wheel assemblies (not shown) are detected by wheel assembly speed sensors 72$i$ (i=fl, fr, rl, and rr). Signals representing the wheel assembly speeds Vwi are input to the electronic control device 60 from the wheel assembly speed sensors 72$i$.

Figure 6:
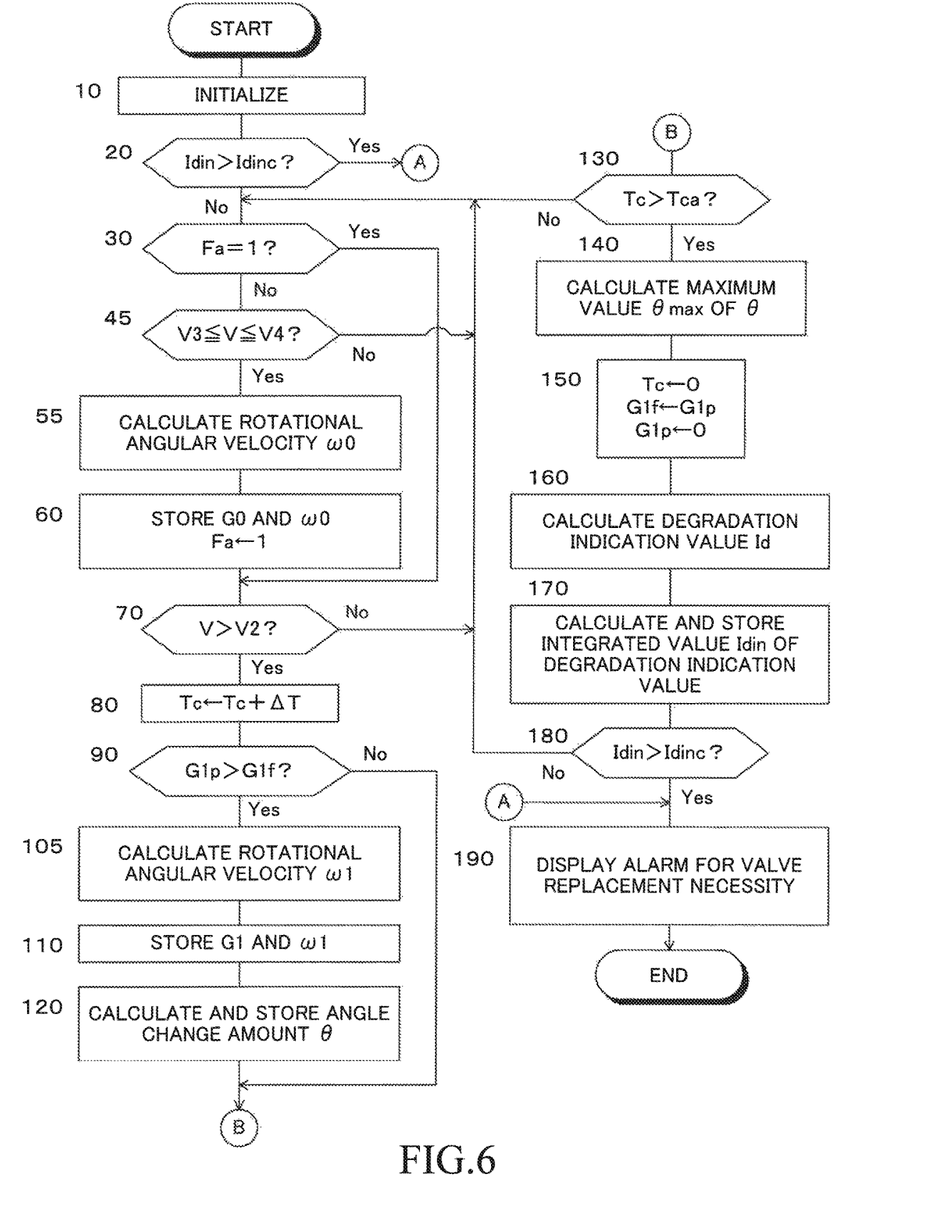
FIG. 6 is a flowchart for illustrating a determination control routine for replacement necessity for a snap-in valve according to the second embodiment.

Further, according to the second embodiment, the determination control for the necessity of the replacement of the snap-in valve 12 is carried out in accordance with a flowchart illustrated in FIG. 6. In FIG. 6, the same step as the step illustrated in FIG. 4 is denoted by the same step number as that assigned in FIG. 4.

As appreciated from a comparison between FIG. 6 and FIG. 4, Step 10 to Step 30 and Step 60 to Step 190 are carried out in the same manner as in the first embodiment, but Step 45 is carried out in place of Step 40 when the negative determination is made in Step 30.

In Step 45, it is determined whether or not the vehicle speed V is equal to or more than a lower limit reference value V3 and equal to or less than an upper and lower limit reference value V4. Thus, a reference rotational speed of the wheel 22 according to the second embodiment is a value within a range of from the lower limit reference value V3 and the upper and lower limit reference value V4. When a negative determination is made, the control returns to Step 30, and when an affirmative determination is made, the control proceeds to Step 55. The lower limit reference value V3 is a positive constant, e.g., 10 km/h. The upper and lower limit reference value V4 is a positive constant less than the reference vehicle speed V1 and the reference value V2 according to the first embodiment. When the vehicle speed V is equal to or more than the lower limit reference value V3, the wheel assembly speed Vwi can accurately be detected. When the vehicle speed V is equal to or less than the upper and lower limit reference value V4, the valve unit 30 remains at the reference position.

In Step 55, the rotational angular velocity $\omega 0$ of the wheel 22 is calculated based on the wheel assembly speed Vwi in accordance with Equation (10). Similarly, in Step 105, the rotational angular velocity $\omega 1$ of the wheel 22 is calculated based on the wheel assembly speed Vwi in accordance with Equation (11).

$$\omega 0 = 2\pi * Vwi/60 \qquad (10)$$

$$\omega 1 = 2\pi * Vwi/60 \qquad (11)$$

As appreciated from the description given above, the wheel assembly speed sensors 72$i$ and Step 55 and Step 105 of FIG. 6 function as the rotational speed acquisition means for acquiring the information on the rotational speed of the wheel 22. Further, in the same manner as in the first embodiment, the acceleration sensor 42 and Step 50 to Step 105 of FIG. 6 function as the angle change amount prediction means. Step 70 to Step 180 of FIG. 6 function as the replacement necessity determination means for determining the necessity of the replacement of the snap-in valve.

According to the second embodiment, Step 10 to Step 30 and Step 60 to Step 190 are carried out in the same manner as in the first embodiment, and hence when the secular degradation of the elastic body 18 progresses and the state in which the replacement of the snap-in valve 12 is necessary is brought about, the alarm notifying that the replacement of the snap-in valve 12 is necessary is displayed on the display device 64. Thus, the occupant of the vehicle can recognize that the replacement of the snap-in valve 12 is necessary through the alarm displayed on the display device 64.

In particular, according to the second embodiment, the reference rotational angular velocity ω0 of the wheel 22 is calculated based on the wheel assembly speed Vwi when the vehicle speed V is equal to or more than the lower limit reference value V3 and is equal to or less than the upper and lower limit reference value V4. The upper and lower limit reference value V4 is a value less than the reference vehicle speed V1 according to the first embodiment. Thus, the reference rotational angular velocity ω0 can be calculated when the vehicle speed V is less than that in the case of the first embodiment, that is, when the valve unit 30 is positively at the reference position in the process of the increase in the vehicle speed V after the vehicle starts traveling.

Moreover, according to the second embodiment, the reference rotational angular velocity ω0 can be calculated without the necessity for the information on the acceleration G detected by the acceleration sensor 42. Thus, compared with the case of the first embodiment, the transmission frequency of the information on the acceleration G by the transmitter 44 can be decreased, thereby decreasing the amount of consumption of the electric energy stored in the battery 46 by the transmitter 44.

[Third Embodiment]

Figure 7:
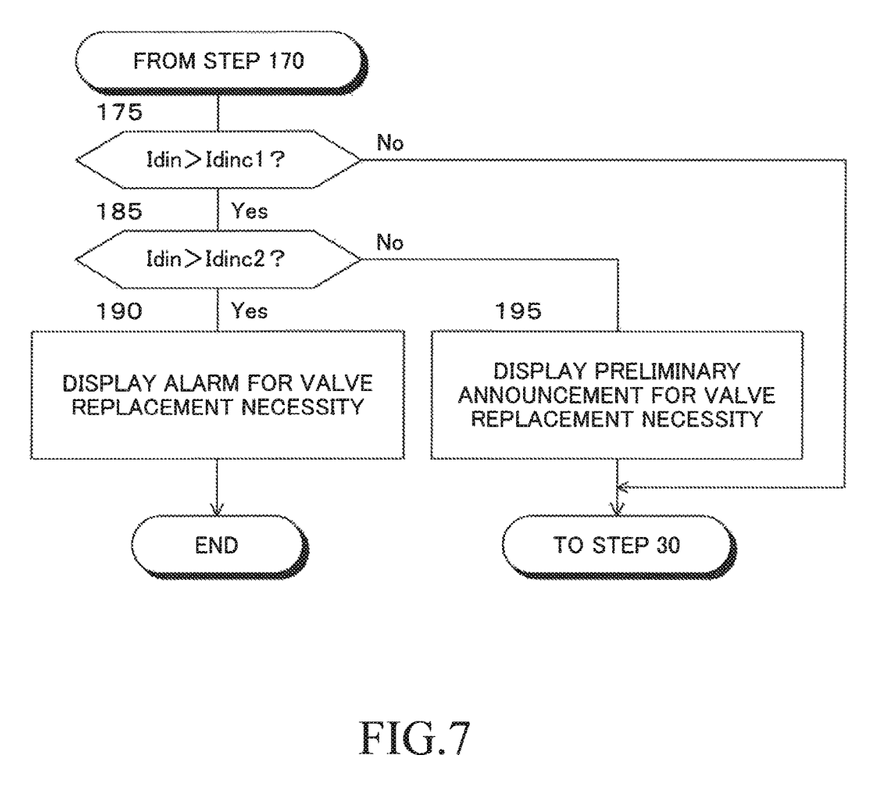
FIG. 7 is a flowchart for illustrating a principal part of a determination control routine for replacement necessity for a snap-in valve according to a third embodiment of the present disclosure.

FIG. 7 is a flowchart for illustrating a principal part of a determination control routine for replacement necessity for the snap-in valve 12 in the replacement necessity determination device 10 according to a third embodiment of the present disclosure constructed as a modified example of the first and second embodiments.

According to the third embodiment, Step 10 to Step 170 are carried out in the same manner as in the cases of the first and second embodiments, but Step 175 is carried out in place of Step 180 when Step 170 is completed.

In Step 175, it is determined whether or not the integrated value Idin of the degradation indication value Id is more than a first reference value Idinc1 set in advance, that is, it is determined whether or not the timing of the replacement of the snap-in valve 12 is approaching. When a negative determination is made, the control returns to Step 30, and when an affirmative determination is made, the control proceeds to Step 185. The first reference value Idinc1 is a positive constant integer (e.g., 800,000) less than the reference value Idinc according to the first embodiment.

In Step 185, it is determined whether or not the integrated value Idin of the degradation indication value Id is more than a second reference value Idinc2 set in advance, that is, it is determined whether or not the replacement of the snap-in valve 12 is necessary. When an affirmative determination is made, the control proceeds to Step 190, and when a negative determination is made, the control proceeds to Step 195. The second reference value Idinc2 may be the same as the reference value Idinc according to the first embodiment.

In Step 195, a preliminary announcement that the timing at which the replacement of the snap-in valve 12 is necessary is approaching is displayed on the display device 64 together with the ID number of the air pressure detection device 28. As a result, attention of the occupant of the vehicle is attracted to the state in which the replacement of the snap-in valve 12 soon becomes necessary.

According to the third embodiment, in the process of the increase in the integrated value Idin of the degradation indication value Id, the affirmative determination is made in Step 175 before the affirmative determination is made in Step 185, and Step 195 is thus carried out. Thus, the state in which the attention is not attracted to the necessity of the replacement of the snap-in valve 12 transitions to the state in which the attention is attracted to the necessity of the replacement of the snap-in valve 12 via the state in which the attention is attracted to the state in which the replacement of the snap-in valve 12 soon becomes necessary. Thus, the occupant of the vehicle can handle the replacement of the snap-in valve 12 at a timing more appropriate than those in the first and second embodiments.

According to the respective embodiments, the integrated value Id of the degradation indication value Idin is stored in the backup memory in Step 170. Then, when the control for the replacement necessity determination starts, in Step 20, it is determined whether or not the integrated value Idin is more than the reference value Idinc. When the affirmative determination is made, in Step 190, the alarm notifying that the replacement of the snap-in valve 12 is necessary is displayed on the display device 64. Thus, compared with a case where the determination in Step 20 is not made before Step 30, Step 30 to Step 180 can be prevented from being carried out in vain, and a period from the start of the control for the replacement necessity determination to the display of the alarm on the display device 64 can also be decreased.

Further, according to the respective embodiments, in Step 90, it is determined whether or not the acceleration G1$p$ in the current cycle is more than the acceleration G1$f$ in the previous cycle. When the affirmative determination is made, Step 100 to Step 120 are carried out, thereby calculating the angle change amount θ of the valve unit 30. Thus, when the acceleration G1$p$ in the current cycle is equal to or less than the acceleration G1$f$ in the previous cycle, the angle change amount θ is not calculated, and hence the number of the calculated change amounts 8 can be decreased compared with the case where the determination in Step 90 is not made. Thus, the maximum value θ max of the angle change amount θ in Step 140 can easily be calculated, and a storage capacity of the RAM required to store the values of the angle change amounts θ can be decreased.

Such a correction may be made that Step 90 is omitted, and when Step 80 is completed, the control proceeds to Step 100. Moreover, Step 90 may be carried out before Step 80.

The specific embodiments of the present disclosure are described in detail above. However, the present disclosure is not limited to the above-mentioned embodiments. It is apparent for those skilled in the art that various other embodiments may be employed within the scope of the present disclosure.

For example, according to the respective embodiments, when the valve unit 30 is at the reference position, the reference surface of the detection unit 48 extends in the direction perpendicular to the radial direction B of the wheel 22, and the acceleration sensor 42 detects the acceleration of the wheel 22 in the radial direction B thereof. However, when the mounting of the valve unit 30 to the rim portion 22R of the wheel 22 is not appropriate, under the state in which the wheel assembly W is stationary, the reference surface of the detection unit 48 may be tilted with respect to the direction vertical to the radial direction B of the wheel 22.

When a tilt angle of the reference surface of the detection unit 48 with respect to the direction vertical to the radial direction B of the wheel 22 is denoted by α, Equation (3) to Equation (5) need to be corrected to Equation (3') to Equation (5'), respectively. However, the tilt angle α is generally a minute value, and hence equations cos α=1, cos(θ+α)=cos θ, and sin(θ+α)=sin θ can be considered to hold true. Thus, even when the tilt exists, the angle change amount θ of the valve unit 30 can also be calculated as in the respective embodiments.

$$F0 \cdot \cos \alpha = M \cdot G0 \quad (3')$$

$$F1 \cdot \cos(\theta + \alpha) = M \cdot G1 \quad (4')$$

$$L \cdot \sin(\theta + \alpha) = R1 - R0 \quad (5')$$

Moreover, according to the respective embodiments, the reference value V2 is the positive constant equal to or more than the reference vehicle speed V1, but V2 may be set to a value more than the vehicle speed V when G0 and ω0 are acquired.

Moreover, according to the respective embodiments, the control device 14 for determining the necessity of the replacement of the snap-in valve 12 is configured to also function as the control device for determining abnormality of the tire air pressure Pa. However, the control device for determining the necessity of the replacement of the snap-in valve 12 may be a control device other than the control device for determining the abnormality of the tire air pressure Pa.

Moreover, according to the respective embodiments, the signal representing whether or not the reset switch 70 has been operated is input from the reset switch 70 to the control device 14. However, in a case where the air pressure detection device 28 is integrated with the snap-in valve 12, and the valve unit 30 is replaced when the snap-in valve 12 is replaced, the electronic control device 60 can determine the replacement of the snap-in valve 12 based on the change in ID number, and hence the reset switch 70 may be omitted.

Further, according to the third embodiment, first, the preliminary announcement that the timing at which the replacement of the snap-in valve 12 is necessary is approaching is displayed, and when the secular degradation further progresses, the alarm notifying that the replacement of the snap-in valve 12 is necessary is displayed. However, the display of the preliminary announcement that the timing at which the replacement of the snap-in valve 12 is necessary is approaching may be corrected so that a color, a size, and the like of the display change gradually as the secular degradation progresses so that a gradual increase in the necessity of the replacement as the secular degradation progresses is recognized.

What is claimed is:

1. A replacement necessity determination device for a snap-in valve, the snap-in valve including a valve stem having a tube shape, and an elastic body covering the valve stem, the snap-in valve being inserted into a hole formed in a wheel configured to hold a tire, and the snap-in valve being mounted to the wheel such that the elastic body is compressed between the valve stem and the wheel, the replacement necessity determination device comprising:
    an air pressure detection device fixed to an inner end of the snap-in valve and positioned in an air chamber formed by the wheel and the tire, the air pressure detection device including:
        an air pressure sensor configured to detect a pressure in the air chamber;
        an acceleration sensor configured to detect an acceleration of the wheel in a radial direction of the wheel; and
        a transmitter configured to wirelessly transmit a signal representing the pressure detected by the air pressure sensor and a signal representing the acceleration detected by the acceleration sensor; and
    a processor configured to:
        receive at least the signal representing the acceleration from the transmitter;
        acquire information on a rotational speed of the wheel;
        predict, based on the rotational speed and the acceleration of the wheel, a change of an angle of the snap-in valve with respect to the wheel, the change of the angle being generated in the radial direction by an elastic deformation of the elastic body from a position of the snap-in valve with respect to the wheel in response to the rotational speed of the wheel being at a reference rotational speed;
        calculate a degradation indication value of the elastic body based on a maximum value of the change of the angle in a time period set in advance when the wheel is rotating at a higher rotational speed than the reference rotational speed;
        calculate an integrated value of the degradation indication value;
        determine that the snap-in valve needs to be replaced in response to the integrated value being higher than an alarm reference value set in advance; and
        generate and output an alarm to notify a user that the snap-in valve needs to be replaced.

2. The replacement necessity determination device according to claim 1, wherein the processor is configured to:
    determine that the snap-in valve needs to be replaced in a future in response to the integrated value being higher than a preliminary announcement reference value, the preliminary announcement reference value being set to a value less than the alarm reference value, and
    generate and output a preliminary announcement to notify the user that replacement of the snap-in valve will be necessary in the future.

3. The replacement necessity determination device according to claim 2, wherein the processor is configured to calculate the rotational speed of the wheel based on an increase/decrease cycle of the acceleration.

4. The replacement necessity determination device for a snap-in valve according to claim 2, further comprising a wheel assembly speed sensor disposed on a wheel assembly including the wheel and the tire, the wheel assembly speed sensor being configured to detect a rotational speed of the wheel assembly,
    wherein the processor is configured to acquire information on the rotational speed from the wheel assembly speed sensor as the information on the rotational speed of the wheel.

5. The replacement necessity determination device according to claim 1, wherein the processor is configured to calculate the rotational speed of the wheel based on an increase/decrease cycle of the acceleration.

6. The replacement necessity determination device according to claim 1, further comprising a wheel assembly speed sensor disposed on a wheel assembly including the wheel and the tire, the wheel assembly speed sensor being configured to detect a rotational speed of the wheel assembly, wherein the processor is configured to acquire information on the rotational speed from the wheel assembly speed sensor as the information on the rotational speed of the wheel.

* * * * *